US012731512B1

(12) United States Patent
Papa

(10) Patent No.: US 12,731,512 B1
(45) Date of Patent: Sep. 8, 2026

(54) EMERGENCY EXIT SIGN COVER

(71) Applicant: Apex Building Solutions, New York, NY (US)

(72) Inventor: Gorian Papa, New York, NY (US)

(73) Assignee: Apex Building Solutions, New York, NY (US)

( * ) Notice: Subject to any disclaimer, the term of this patent is extended or adjusted under 35 U.S.C. 154(b) by 0 days.

(21) Appl. No.: 19/637,866

(22) Filed: Apr. 2, 2026

(51) Int. Cl.
*G09F 13/04* (2006.01)

(52) U.S. Cl.
CPC ................................ *G09F 13/0413* (2013.01)

(58) Field of Classification Search
CPC ............. G09F 13/0413; G09F 13/0445; G09F 2013/08
See application file for complete search history.

(56) References Cited

U.S. PATENT DOCUMENTS 3,826,912 A * 7/1974 Pomroy .................. F21V 15/02 362/378
5,047,907 A * 9/1991 Hawkins ................. G09F 13/10 362/311.04
5,537,304 A * 7/1996 Klaus ....................... F21V 29/15 362/147
5,572,819 A * 11/1996 Topinka .................. G09F 13/04 362/812
5,651,612 A * 7/1997 Braun ........................ F21S 8/08 362/431
5,823,665 A * 10/1998 Braun ..................... F21S 8/086 362/431
6,910,787 B2 * 6/2005 Thome .................... F21V 15/02 362/147
D508,538 S * 8/2005 Furr ............................... D20/10
8,985,817 B1 * 3/2015 Schalch, III ............ F21V 15/02 362/147

* cited by examiner

*Primary Examiner* — Gary C Hoge
(74) *Attorney, Agent, or Firm* — Foley & Lardner LLP

(57) ABSTRACT

A hardened cover that is at least partially transparent to enable viewing of an emergency exit sign may be disposed over the emergency exit sign to prevent access thereto. The cover may be formed of one and more components that surround or at least partially cover the emergency exit sign. The cover may be sufficiently thick and be formed of an anti-shatter material so to prevent breakage thereof, even in the event of being struck by strong objects, such as pipes, bats, and the like. For example, the material of the cover may be formed of ballistic-grade glass material, such as laminated polycarbonate, glass-clad polycarbonate, monolithic acrylic, and so on. The ballistic-grade materials often have adhesive inter-layers, such as polyvinyl butyral (PVB) or ethylene-vinyl acetate (EVA), or otherwise, that are used to bond other layers.

18 Claims, 3 Drawing Sheets

EMERGENCY EXIT SIGN COVER

BACKGROUND

Correctional institutions are inherently dangerous. As understood by correctional officers who work at correctional institutions, any fixtures that are not sufficiently secured are either torn off or broken, and are the fixtures and portions thereof and then often used as weapons. Emergency exit signs are by law required to be positioned at exit doors in the correctional institutions to assist people exiting the correctional institutions, especially in the event of an emergency, such as a fire. Emergency exit signs, as with any other fixture, are a target for inmates and are often torn off or broken for use in making weapons or just because the emergency exit signs are accessible to the inmates. As such, there is a need to secure emergency exit signs to prevent undesired removal or destruction thereof.

SUMMARY

To prevent undesired removal or destruction of emergency exit signs, a hardened cover that is at least partially transparent to enable viewing of an emergency exit sign may be disposed over the emergency exit sign to prevent access thereto. In an embodiment, the cover may be formed of one and more components that surround or at least partially cover the emergency exit sign. The cover may be sufficiently thick and be formed of an anti-shatter material so to prevent breakage thereof, even in the event of being struck by strong objects, such as pipes, bats, and the like. For example, the material of the cover may be formed of ballistic-grade glass material, such as laminated polycarbonate, glass-clad polycarbonate, monolithic acrylic, and so on. The ballistic-grade materials often have adhesive inter-layers, such as polyvinyl butyral (PVB) or ethylene-vinyl acetate (EVA) that are used to bond other layers.

One embodiment of a cover for an emergency exit sign may include a first side panel, and a second side panel connected to the first side panel so as to respectively cover respective first and second sides of the emergency exit sign. The first and second side panels may be formed of ballistic-grade material that is at least partially transparent to enable the emergency exit sign to be visible when covered by the cover. In being connected, the first and second side panels may be directly or indirectly connected with one another.

One embodiment of a method of protecting an emergency exit sign may include mounting a cover configured to prevent access to the emergency exit sign suspended from a ceiling. The cover may be formed of ballistic-grade material that is at least partially transparent to enable the emergency exit sign to be visible when covered by the cover.

BRIEF DESCRIPTION OF THE FIGURES

A more complete understanding of the method and apparatus of the present invention may be obtained by reference to the following Detailed Description when taken in conjunction with the accompanying figures wherein.

DETAILED DESCRIPTION

Before turning to the figures, which illustrate certain illustrative embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
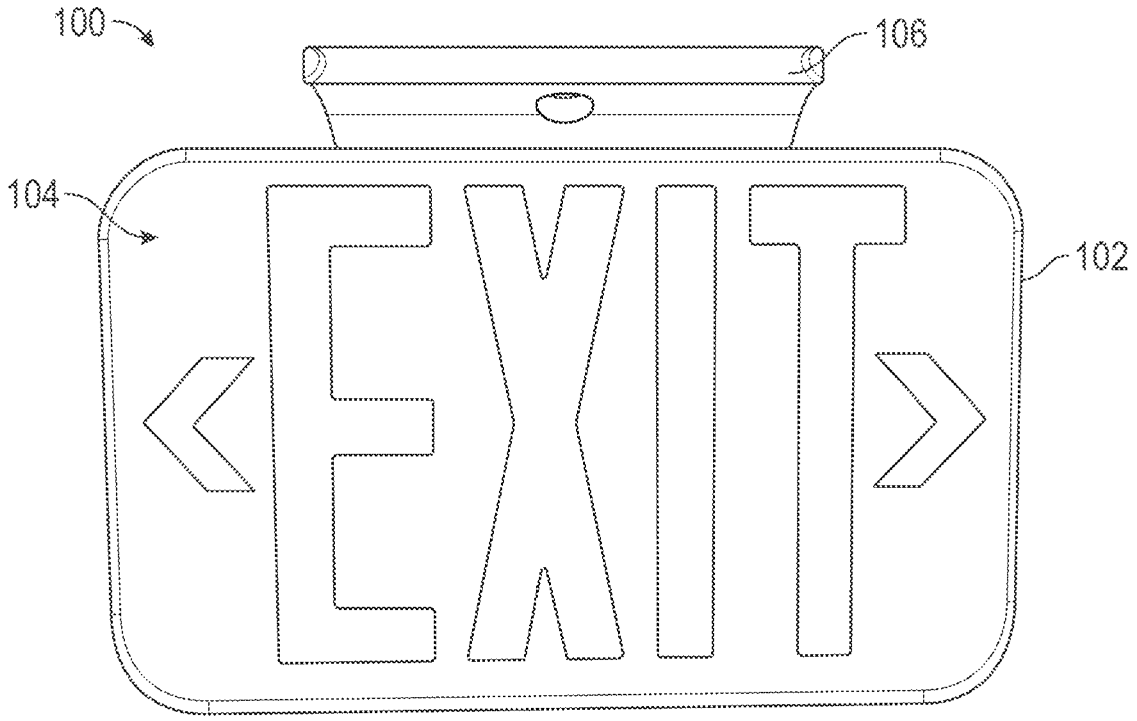
FIG. 1 (Prior Art)
FIG. 1 is an illustration of an illustrative conventional exit sign that is generally positioned above doors, such as emergency exit doors, as required by law or otherwise.

With regard to FIG. 1, an illustration of an illustrative conventional emergency exit sign 100 that is generally positioned above doors, such as emergency exit doors, as required by law or otherwise is shown. The emergency exit sign 100 includes a sign or panel portion 102 with lettering and/or symbols 104. The sign portion 102 may be single-sided or double sided (i.e., with the lettering and/or symbols 104 on one or both sides of the sign portion 102). A typical size of the sign portion 102 is about 12-inches (305 mm) wide by 8-inches (203 mm) high. An overall housing, including a mounting bracket 106, may be slightly larger (e.g., 2-4 inches wider). In the U.S., the size of the lettering and/or symbols 104 are specified by OSHA and NFPA 101 (Life Safety Code), with the letters spelling "EXIT" being at least 6-inches (152 mm) high and a stroke width of at least ¾-inch (19 mm), so the sign portion 102 is to be sufficiently large to accommodate the size of the letters and/or symbols 104. The thickness/depth of the emergency exit sign 100 that is hung from a ceiling typically has a depth of 1.5-inches to 2-inches for the sign portion 102. The mounting bracket or suspension hardware 106 adds more depth. In general, most emergency exit signs include a sign portion 102 in the range of 12-inches×8-inches to 14-inches. It should be understood that non-U.S. countries may specify different letter heights and dimensions of the sign portion 102.

Figure 2A:
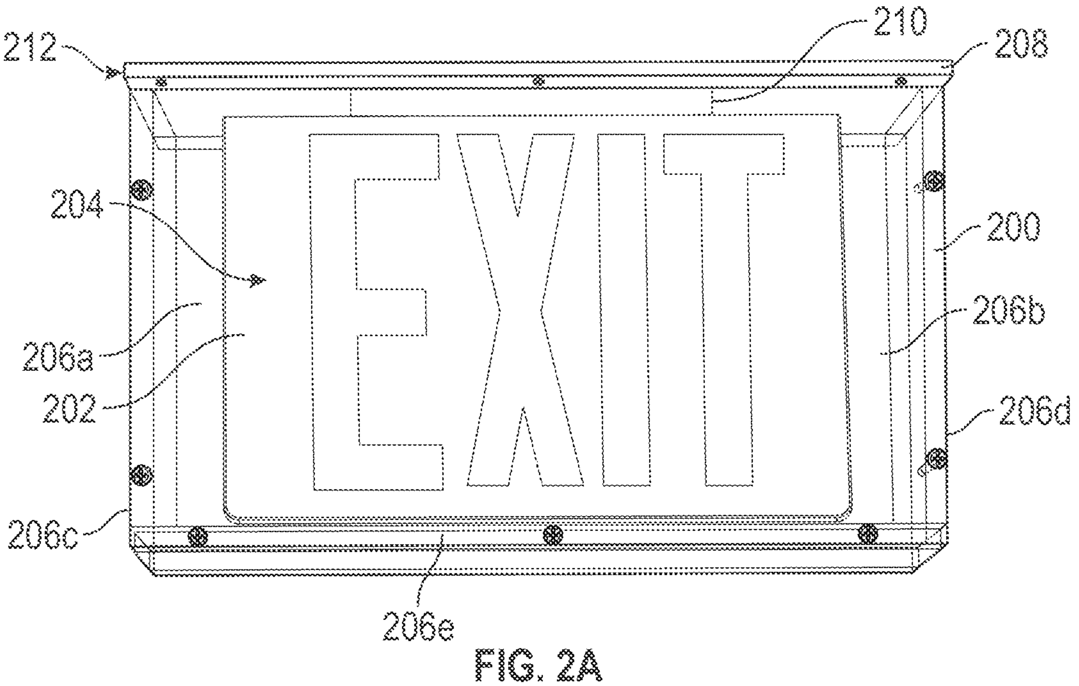
FIGS. 2A-2C are images of front, left side, and bottom perspective views of an illustrative cover configured to protect an emergency exit sign.
Figure 2B:
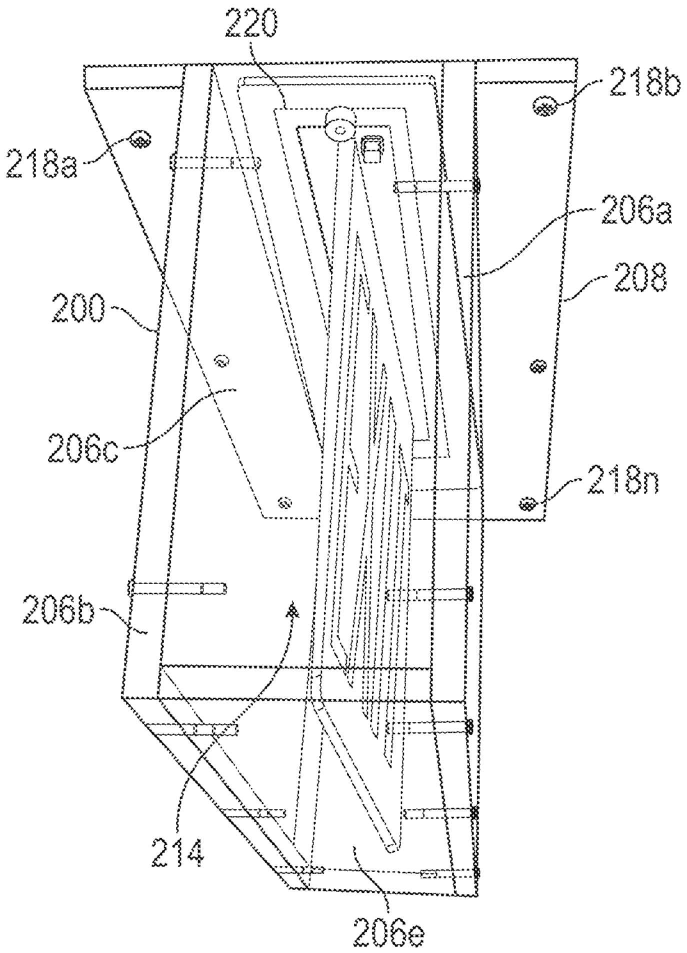
Figure 2C:
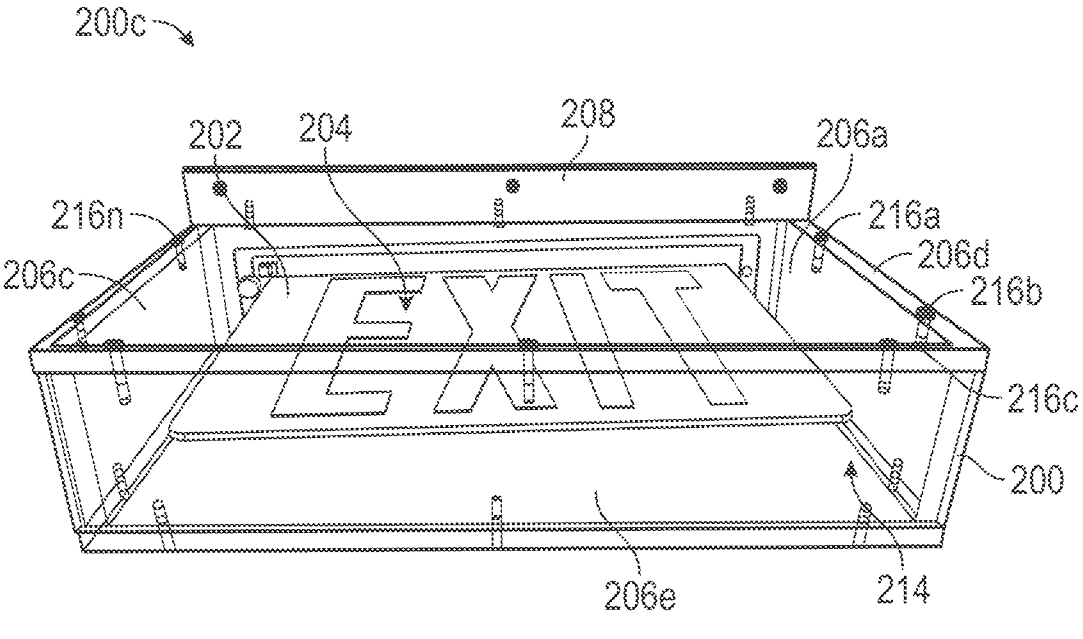

With regard to FIGS. 2A-2C, images of respective front, left side, and bottom perspective views of an illustrative cover 200 configured to protect an emergency exit sign 202 including letters (i.e., "EXIT") 204 is shown. With specific regard to FIG. 2A, the cover 200 may include a first side panel **206*a* (front side) and a second side panel 206*b* (rear side), first end panel 206*c* (left side), second end panel 206*d* (right side), and bottom panel 206*e* (collectively panels 206). As shown, the first side panel 206*a* and second side panel 206*b* may be parallel with one another. The first and second side panels 206*a* and 206*b* may be connected with one another. In being connected with one another, the side panels 206*a* and 206*b* may be directly connected with one another by being formed of a single common material in a mold or formed from a block of material such that the side panels 206*a* and 206*b* are monolithic and connected to one another due to being integrated with one another. In being connected with one another, the side panels 206*a* and 206*b* may be indirectly connected to one another by being formed of the same or different materials and be connected via the first end panel 206*c*, second end panel 206*d*, and/or bottom panel 206*e***.

A mounting bracket 208 (formed of one or more individual or integrated brackets) to which one or more of the panels **206*a*-206*d* of the cover 200 connects is shown mounted to a ceiling 210 to which the emergency exit sign 202 is mounted. In connecting to the mounting bracket 208, one or more of the panels 206***a*-206*d* may be directly or indirectly connected to the mounting bracket 208 at an end or base end 212 opposed to the bottom panel 206*e*. The cover 200 with panels 206, when installed around the emergency exit sign 202, may surround or at least sandwich the emergency exit sign 202.

Each of the panels 206 may be sufficiently thick and formed of an anti-shatter material so to prevent breakage thereof, even in the event of being struck by strong objects, such as pipes, bats, and the like. For example, the material of the cover may be formed of ballistic-grade glass material, such as laminated polycarbonate, glass-clad polycarbonate, monolithic acrylic, and so on. Such ballistic-grade materials may be consistent with UL752 & NIJ ballistic resistance standards, for example. The ballistic-grade materials often have adhesive inter-layers, such as polyvinyl butyral (PVB) or ethylene-vinyl acetate (EVA) that are used to bond other layers. In an embodiment, the panels 206, and/or any other panel or structural member, may be formed of Lexan™ Exell D FR polycarbonate sheet at 12 mm or other thickness as this material meets ballistic ratings as well as certified ASTM 84 class A fire rating. Alternative materials may be utilized to provide the same or similar functionality.

The panels 206 may have approximately the same thickness and length. In an embodiment, the thickness may be approximately 0.5-inches thick, approximately 1-inch thick, approximately 2-inches thick, or other thickness. Distances between the panels 206 that define a slot and/or cavity may be sufficient to enable a conventional emergency exit sign to extend therethrough. In an embodiment, the distances may provide for a certain spacing between the panels 206 and the emergency exit sign (e.g., about 0.5 inches, 1 inch, etc.). The panels 206 may be transparent. Alternatively, a portion of the panels 206 may be translucent or opaque. That is, one or more of the panels 206 may be at least partially transparent (e.g., edge regions may be opaque, a 5% or 10% translucent coating may be applied, etc.). However, the letters 204 are to be visible at any angle relative to the emergency exit sign 202 via the cover 200. Distal corners and edges of the panels 206 may be rounded or curved.

The panels 206 may be sized to provide for the emergency exit sign 204 to be positioned within a cavity 218 defined by the panels 206. The cavity 214 may provide for about one or more inches between inner walls of the panels 206 and outer surfaces of the exit sign 202. Alternative dimensions of the spacing within the cavity 214 are possible. If the panels 206 are vertical, then the length, width, and height of the cavity 214 may be constant from the end 212 to the bottom panel 206*e*.

The panels 206 may also be coated with one or more thin films, such as an anti-reflective thin film coating, disposed thereon to reduce reflections from surfaces of the panels 206 and to help improve visibility of the letters 204. As shown, to secure the panels 206 with one another, fastening members 216*a*-216*n* (collectively 216) may extend from edges of one panel into edges of another panel, such that there are at least four fastening members 216 extending into each of the panels 206 from other panels. The fastening members 216 may be bolts, screws, or otherwise, that are configured to secure the various panels 206 together. In an embodiment, the fastening members 216 may have standard heads or proprietary heads for which a standard or proprietary screwdriver may be used. The fastening members 216 may be recessed and may be meant to be difficult to operate without a proper tool, thereby limiting access to the emergency exit sign 202. In an embodiment, covers (not shown) may be disposed over the fastening members 220 so as to further prevent tampering. The panels 206 may be removed with a non-standard or special tool that is not readily accessible to inmates or other people who do not perform maintenance of construction of the emergency exit sign 202 or cover 200.

In an embodiment, the fastening members 216 may be in the form of screws, such as Tam-Rex™ or Rex screws (formerly known as Stykfit® 7), that feature a tamper-proof Rex drive. Features of the Tam-Rex screws may include a tamper-resistant that prevents unauthorized removal, thereby providing added security over standard Torx-pin or hex security screws. A high-torque, tight-fitting drive may provide for similar robust performance as the Rex drive, thereby ensuring strong torque transfer without cam-out. A stick-fit design may for a driver bit that holds screws securely during installation, thereby reducing dropped screws and improving productivity. The screws may be formed of stainless steel for corrosion resistance and long-term durability. The Rex screws may help to ensure proper torque transfer while maintaining tamper-resistant functionality of the cover 200.

In an embodiment, the mounting bracket 208 may be connected to the panels 206*a*-206*d* via the fastening members 216. The mounting bracket 208 may flange beyond the outer dimensions of the panels 206*a*-206*d* at the end 212, such that the mounting bracket 208 may be connected to the ceiling using fastening members 218*a*-218*n* (collectively 218). The number of fastening members 218 may range from 4-20, for example, to improve coupling with the ceiling. The fastening members 218 may be the same or different from the fastening members 216 that connect the panels 206 with one another. The mounting bracket 208 may be positioned proximate to a mounting bracket 220 of the emergency exit sign 202. The proximate position may be within about 0.25 inches, 0.5 inches, etc., to the sides of (i.e., left and right) and/or surrounding (i.e., left, right, and opposing ends) the mounting bracket 220 for mounting the emergency exit sign 202 to the ceiling 210. Thickness of the mounting bracket 208 may be the same or different from the thickness of the mounting bracket 220. As shown, the cavity 214 may be open on the end 212 to enable the panels 206 to simply slide over the emergency exit sign 202 so that the cover 200 houses or covers the emergency exit sign 202 in the cavity 214. In an alternative embodiment, the emergency exit sign 202 may be connected to a mounting bracket that covers an opening at the end 212 defined by the panels 206, which enables installation of a new emergency exit sign to be performed simultaneously with the cover 200.

Figure 3:
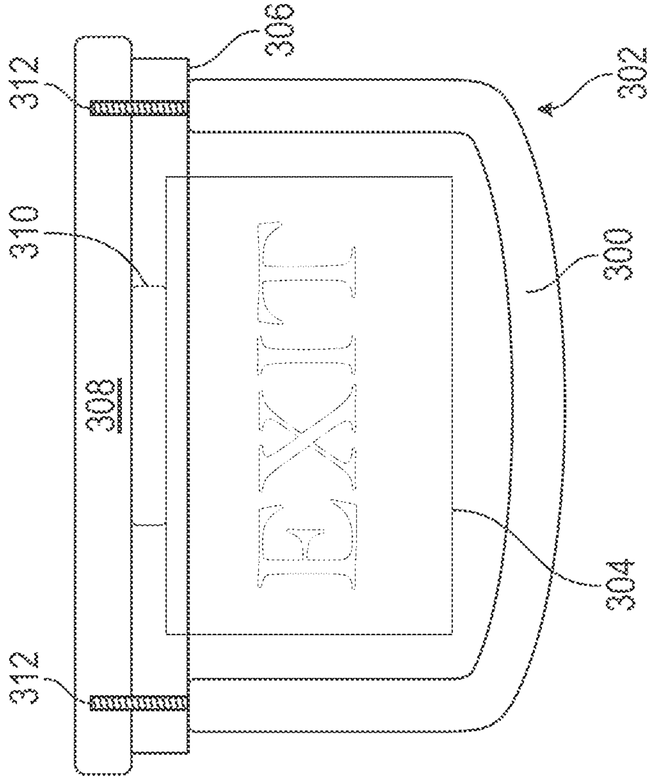
FIG. 3 is an illustration of an alternative embodiment of a cover having rounded edges and/or corners for preventing access to an emergency exit sign.

With regard to FIG. 3, an illustration of an alternative embodiment of a cover 300 having rounded edges and/or corners 302 for preventing access to an emergency exit sign 304 is shown. In this embodiment, the cover 300 may be connected to a mounting bracket 306 that secures the cover 300 to a ceiling 308 at a location at which the emergency exit sign 304 is mounted via an existing mounting bracket 310. The mounting bracket 306 may be mounted to the ceiling to the sides and/or surrounding the mounting bracket 310. By having rounded corners 302 and/or edges of the cover 300, the ability for the cover 300 to cause a skin cutting function is reduced. Fastening members 312 that connect the cover 300 to the mounting bracket 306 and/or ceiling 310 may be utilized. The cover 300 may be formed of a single member or component that is formed in a mold, thereby avoiding having to connect panels to one another, as is the case of the cover 200 of FIGS. 2A-2C. In yet another embodiment, multiple panels (e.g., left and first end, and right and second end) may be produced using a mold, thereby reducing assembly components and time. The cover 300 may have a variety of different configurations to provide for the same or similar functionality as described herein.

Figure 4:
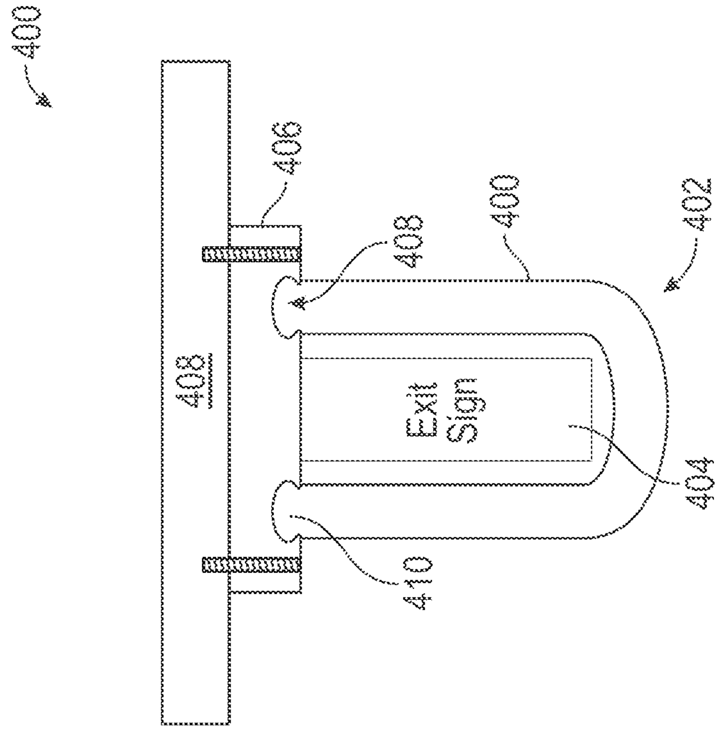
FIG. 4 is an illustration of an alternative embodiment of a cover having rounded edges and/or corners for preventing access to an emergency exit sign.

With regard to FIG. 4, an illustration of an alternative embodiment of a cover 400 having rounded edges and/or corners 402 for preventing access to an emergency exit sign 404 is shown. In this embodiment, the cover 400 may be connected and/or engaged to a mounting bracket 406 that secures the cover 400 to a ceiling 408 at a location at which the emergency exit sign 404 is mounted. The mounting bracket 406 may include a pair of elongated slots or channels 408 on opposing sides of the emergency exit sign 404 in which bulbous features or retention features 410 that are elongated are configured to extend through to retain the cover 400 by the mounting bracket 406. The slots 408 may have openings that are perpendicularly aligned with the ceiling such that the cover 400 may be extended parallel to the ceiling when engaging the mounting bracket 406 using the retention features 410, thereby interconnecting the cover 400 and mounting bracket 406. A profile of the retention features 410 may be reciprocal to a profile of the slots 408. By using retention features 410 (e.g., one or more protrusions) and slots 408 (e.g., one or more indentations), additional hardware to secure the cover 400 and mounting bracket 406 may be eliminated as the cover 400 interfaces directly with the mounting bracket 406. In an embodiment, rather than having a conventional emergency exit sign 404, the cover 400 may be configured with a built-in emergency exit sign that may be used in lieu of the conventional exit sign 404. In an embodiment, rather than connecting a mounting bracket to the ceiling 408, the cover 400 may have a mounting bracket feature (not shown) integrated as part of the cover 400 such that that cover 400 may be directly mounted to the ceiling 408.

Features of an Emergency Exit Sign Cover

One embodiment of a cover for an emergency exit sign may include a first side panel, and a second side panel connected, either directly or indirectly connected, to the first side panel so as to respectively cover respective first and second sides of the emergency exit sign. The first and second side panels may be formed of ballistic-grade material that is at least partially transparent to enable the emergency exit sign to be visible when covered by the cover.

In an embodiment, the first and second side panels may be formed of the same material and have substantially the same dimensions. The first and second side panels may be integrated as a single component with edge panels extending between the first and second side panels, where the side panels may be in parallel with one another. Edge panels that connect with the first and second side panels, such that sides and edges, other than an edge disposed at a ceiling to which the emergency exit sign is mounted, may be surrounded by the cover when the cover is positioned over the emergency exit sign when mounted to the ceiling.

A base portion at a proximal end of the first and second side panels may define a slot through which the emergency exit sign extends when the emergency exit cover is mounted at the emergency exit. The slot may be at least about 2-inches to about 4-inches wider than a width of the emergency exit sign. In an embodiment, length of the first and second side panels, when positioned over the emergency exit sign (e.g., when mounted to a mounting bracket), may be at least about 0.5-inches to about 2-inches longer than the emergency exit sign (e.g., extend below the emergency exit sign by about 0.5-inches to about 2-inches).

The ballistic-grade material may include multiple layers. Distal corners and edges of the first and second side panels may be curved. The first and second side panels may be connected to one another by at least one fastening member. A mounting bracket may further be included, where the mounting bracket may be configured to mount to a ceiling at an emergency exit sign (e.g., surrounding a mounting bracket of the emergency exit sign) and may include at least one feature configured to interface with a reciprocal feature positioned at a proximal end of the first and second side panels. The feature(s) may include elongated protrusions and/or indentations that enables the first and second side panels of the cover to slide along the elongated protrusions and/or indentations of the mounting bracket. The mounting bracket may be formed of the same material as the first and second side panels. The mounting bracket may define openings aligned perpendicular to the ceiling when the mounting bracket is mounted thereto.

The side panels may have a common thickness in an embodiment. The common thickness may be at least about two-inches thick. The first, second, and third ends that interconnect each of the first and second end panels may further be included. Rivets that connect the first, second, and third end panels with the first and second side panels may further be included.

Features of a Method of Installing an Emergency Exit Sign Cover

One embodiment of a method of protecting an emergency exit sign may include mounting a cover configured to prevent access to the emergency exit sign suspended from a ceiling. The cover may be formed of ballistic-grade material that is at least partially transparent to enable the emergency exit sign to be visible when covered by the cover.

Mounting the cover may include mounting the cover indirectly to a ceiling at which the emergency exit sign is connected. Mounting the cover may include mounting a first mounting bracket configured to support the cover proximate to a second mounting bracket configured to support an emergency exit sign mounting bracket supporting the emergency exit sign.

In an embodiment, mounting the cover may include mounting the cover formed of multiple panels that, when assembled, form a cavity having a slot on an end within which the emergency exit sign enters and is positioned when the cover is mounted.

As utilized herein, the terms “substantially,” “about,” and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If “coupled” or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While the instant disclosure has been described above according to its preferred embodiments, it can be modified within the spirit and scope of this disclosure. This application is therefore intended to cover any variations, uses, or adaptations of the instant disclosure using the general principles disclosed herein. Further, the instant application is intended to cover such departures from the present disclosure as come within the known or customary practice in the art to which this disclosure pertains.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It is noted that any element disclosed in one embodiment may be incorporated or utilized with any other embodiment disclosed herein.

What is claimed is:

1. A cover for an emergency exit sign, comprising:

a first side panel;

a second side panel connected to the first side panel so as to respectively cover respective first and second sides of the emergency exit sign, the first and second side panels being formed of ballistic-grade material that is at least partially transparent to enable the emergency exit sign to be visible when covered by the cover; and a first mounting bracket configured to mount to a ceiling at which the emergency exit sign is mounted via a second mounting bracket, the first mounting bracket further configured to enable the first and second side panels to be supported thereby for the first and second side panels to cover the emergency exit sign.

2. The cover according to claim 1, wherein the first and second side panels are formed of the same material and have substantially the same dimensions.

3. The cover according to claim 1, wherein the first and second side panels are integrated as a single component with edge panels extending between the first and second side panels, the side panels being in parallel with one another.

4. The cover according to claim 1, further comprising edge panels that connect with the first and second side panels, such that sides and edges, other than an edge disposed at a ceiling to which the emergency exit sign is mounted, of the emergency exit sign are surrounded by the cover when the cover is positioned over the emergency exit sign when mounted to the ceiling.

5. The cover according to claim 4, wherein a base portion at a proximal end of the first and second side panels defines a slot through which the emergency exit sign extends when the cover is mounted at the emergency exit sign.

6. The cover according to claim 5, wherein the slot is at least about 2-inches to about 4-inches wider than a width of the emergency exit sign.

7. The cover according to claim 6, wherein length of the first and second side panels, when positioned over the emergency exit sign, are at least about 0.5-inches to about 2-inches longer than the emergency exit sign.

8. The cover according to claim 1, wherein distal corners and edges of the first and second side panels are curved.

9. The cover according to claim 1, wherein the first and second side panels are connected to one another by at least one fastening member.

10. The cover according to claim 1, wherein the mounting bracket includes at least one feature configured to interface with a reciprocal feature positioned at a proximal end of the first and second side panels.

11. The cover according to claim 10, wherein the at least one feature includes elongated protrusions and/or indentations that enables the first and second side panels of the cover to slide along the elongated protrusions and/or indentations of the mounting bracket.

12. The cover according to claim 11, wherein the mounting bracket is formed of the same material as the first and second side panels.

13. The cover according to claim 12, wherein the mounting bracket defines openings aligned perpendicular to the ceiling when the mounting bracket is mounted thereto.

14. The cover according to claim 1, wherein the first and second side panels have a common thickness that is at least about two-inches thick.

15. The cover according to claim 1, further comprising first, second, and third end panels that interconnect each of the first and second side panels.

16. The cover according to claim 15, further comprising rivets that connect the first, second, and third end panels with the first and second side panels.

17. A method of protecting an emergency exit sign, comprising:

mounting a cover configured to prevent access to the emergency exit sign suspended from a ceiling, the cover formed of ballistic-grade material that is at least partially transparent to enable the emergency exit sign to be visible when covered by the cover, wherein mounting the cover includes mounting the cover indirectly to a ceiling at which the emergency exit sign is connected, and wherein mounting the cover includes mounting a first mounting bracket configured to support the cover proximate to a second mounting bracket configured to support an emergency exit sign mounting bracket supporting the emergency exit sign.

18. The method according to claim 17, wherein mounting the cover includes mounting the cover formed of multiple panels that, when assembled, form a cavity having a slot on an end within which the emergency exit sign enters and is positioned when the cover is mounted.

* * * * *